United States Patent [19]

Rinkewich

[11] Patent Number: 5,421,515
[45] Date of Patent: Jun. 6, 1995

[54] AUTOMATIC IRRIGATION DEVICE

[76] Inventor: Isaac Rinkewich, P.O. Box 1209, Hightstown, N.J. 08520

[21] Appl. No.: 252,134

[22] Filed: May 31, 1994

Related U.S. Application Data

[63] Continuation of Ser. No. 59,612, May 12, 1993, abandoned.

[51] Int. Cl.⁶ .............................. B05B 12/12
[52] U.S. Cl. .......................... 239/68; 239/67; 239/542; 137/408; 47/79
[58] Field of Search ............. 239/11, 67, 68, 542; 47/79 C; 137/408

[56] References Cited

U.S. PATENT DOCUMENTS

| | | | |
|---|---|---|---|
| 2,004,194 | 6/1935 | DeLacy-Mulhall | 239/67 X |
| 2,766,070 | 10/1956 | Park | 137/408 X |
| 3,036,780 | 5/1962 | Nelson | 137/408 X |
| 3,242,924 | 3/1966 | Kraft et al. | 137/408 X |
| 3,517,684 | 6/1970 | Mitchell | 137/408 X |
| 3,741,239 | 6/1973 | Riddiford | 137/408 |
| 4,060,934 | 12/1977 | Skaggs | 239/67 X |
| 4,158,441 | 6/1979 | Stan | 239/68 |
| 4,241,538 | 12/1980 | Lahr | 137/408 X |
| 4,760,666 | 8/1988 | Han | 47/79 C |

FOREIGN PATENT DOCUMENTS 2428390 2/1980 France .................. 239/67

Primary Examiner—William A. Grant
Attorney, Agent, or Firm—Benjamin J. Barish

[57] ABSTRACT

An automatic irrigation device for plants which is automatically activated in correlation with the evapotranspiration needs of the plants comprises an open-top fluid evaporation pan containing the irrigating fluids, the fluids being capable of evaporating from the pan, thereby reducing its weight. A fluid conduit attached to a fluid inlet port conducts the fluids to the plants and the pan while a valve, interposed between the inlet port and the conduit and operatively connected to the pan, controls the conduction of the fluids to the pan and the plants. A counter-force member exerts a force on the pan in a direction opposite to that of the force of gravity. When the pan holds more than a first amount of fluid the valve closes and the device enters the evaporating stage. When the pan holds less than a second, lesser amount of fluid the valve opens and the device enters the irrigating stage. The device can be used to automatically irrigate a large number of plants simultaneously. A method for automatically watering plants is also described.

7 Claims, 3 Drawing Sheets

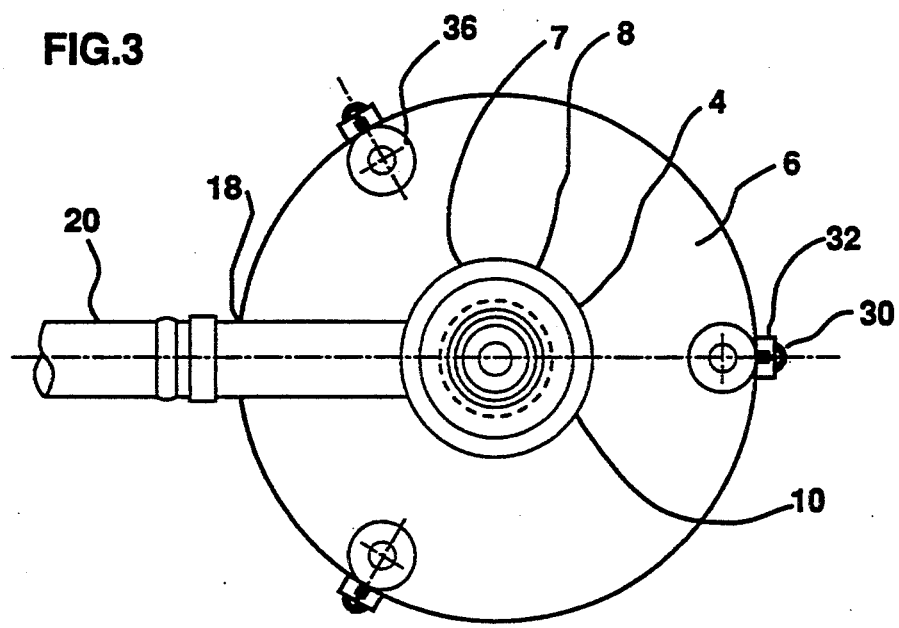
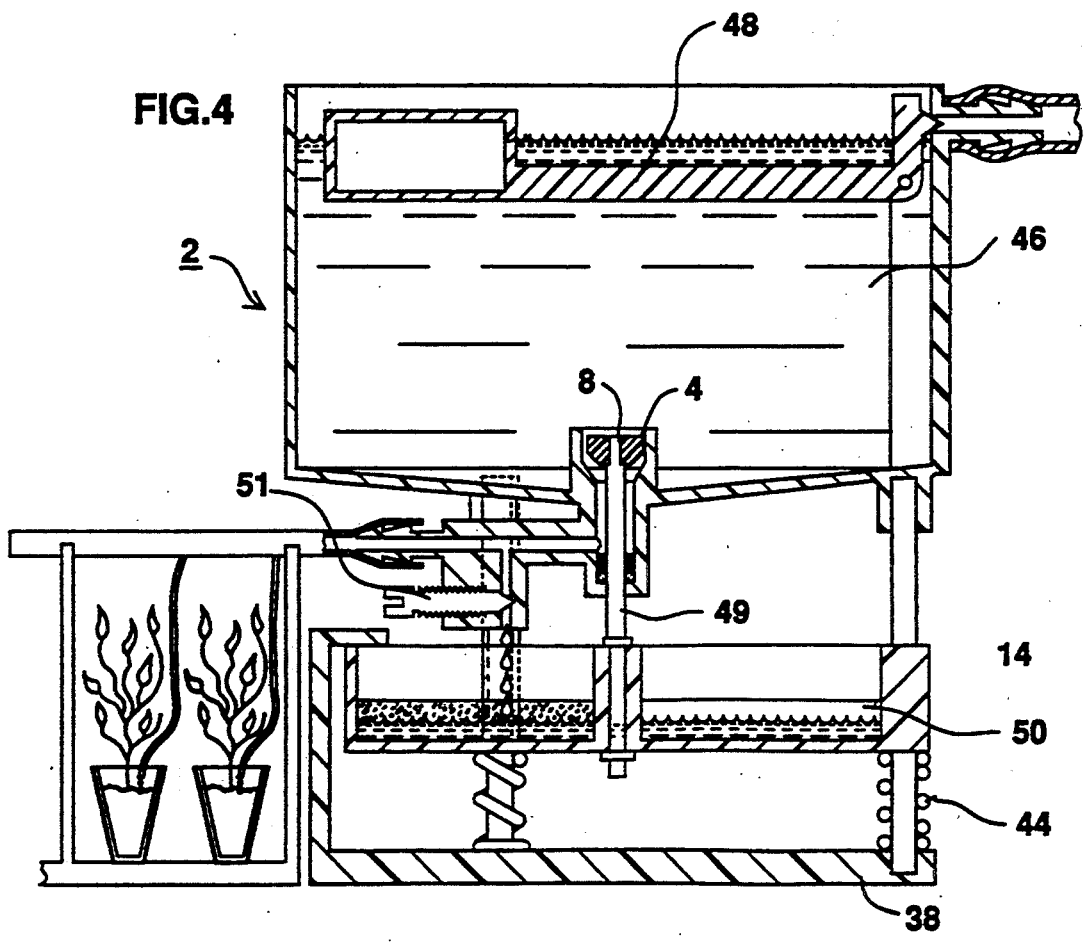

AUTOMATIC IRRIGATION DEVICE

This application is a continuation of application Ser. No. 08/059,612, filed May 12, 1993, now abandoned.

FIELD AND BACKGROUND OF THE INVENTION

The present invention relates to an irrigation device for plants and, more particularly, to an irrigation device which is automatically activated in correlation with the evapotranspiration needs of the plants.

Many types of devices are known which relieve the necessity of manually watering potted plants. The simplest of these automatic devices deliver a predetermined amount of water to the plant or water the plant for a predetermined amount of time. These devices do not take into account the real-time needs of the plant at the time of watering, but rather work according to a watering rate which was determined previously, at which time the environmental conditions may have been greatly different.

In more sophisticated devices, the watering rate is determined by the current moisture content of the plant and/or its soil. In these devices, the plant is watered only after it has dried out to a specified extent.

One major method of determining the moisture content is to use various moisture sensors placed in the soil or elseware in the vicinity of the plant. These are usually expensive to produce and operate and are not suitable for general use. In a second method, exemplified in U.S. Pat. No. 4,557,071, water is transferred to the soil by capillary action as a function of the dryness of the soil. This method, however, is unreliable as it depends on local soil conditions which may be unrepresentitive. Both of these methods suffer from the major disadvantage that they are not compatible for use with a large number of plants, since each individual plant needs a separate device to control its watering rate.

A third method determines the moisture content of the plant by measuring the weight of the plant together with its soil. This method is disclosed, for example, in U.S. Pat. Nos. 3,168,797, 4,060,934 and 4,760,666. This method also suffers from the forementioned disadvantage that each individual plant requires a separate weighing device. Although U.S. Pat. No. 4,060,934 discloses an automatic water tender which waters a plurality of plants, the controlling mechanism is dependent on the weight loss of a single plant. In the event that the water consumption of the single monitored plant differs from that of the other plants, the other plants will not receive their optimal water portion.

OBJECT AND BRIEF SUMMARY OF THE INVENTION

It is an object of the invention to provide a device for automatically irrigating plants simply and inexpensively.

It is a further object of the invention to provide a device which automatically irrigates plants in response to their moisture state.

It is a still further object of the invention to provide a device capable of automatically irrigating a large number of individual plants.

In accordance with the present invention, there is provided an irrigation device for supplying irrigating water to plants, comprising: a base; an open evaporation pan for receiving water to be evaporated; a displaceable mounting for the evaporation pan permitting the evaporation pan to descend or rise with respect to the base according to the weight of the evaporation pan and the water therein; a conduit for conducting water from a water source to a plant to be irrigated, and to the evaporation pan; a valve including a valve member and a valve actuator for opening or closing water flow to the plant to be irrigated, and to the evaporation pan; and a toggle mechanism coupled to the evaporation pan and the valve actuator, and including an over-center spring to actuate the toggle mechanism with a snap-action to a first stable state closing the valve when the evaporation pan has received sufficient water to cause it to descend to a first position with respect to the base, or to a second stable state opening the valve when sufficient water has been evaporated from the evaporation pan to cause it to rise to a second position with respect to the base.

The device of the invention works in a cyclic fashion, consisting of an irrigation stage and an evaporation stage. During the irrigation stage the valve is open and the water flows to the plants and the evaporation pan simultaneously. The water is delivered to the plants and pan through the same conduit, but the flow rate to the individual plants can be adjusted to the needs of each plant in a manner which will be described below. The flow rate to the pan determines the duration of the irrigation stage; i.e. the faster the rate, the shorter the irrigation stage, and vice versa.

When the pan has been filled with an amount of water determined by the needs of the plants, the valve means closes and the device enters the evaporation stage. In this stage, water evaporates from the plants and their surrounding soil as well as from the pan. Factors such as temperature, humidity, sun radiation, wind, top soil surface area and the bulk and surface area of plant growth above the soil surface affect the plants' water requirement. In a similar manner, the major factors influencing the pan evaporation rate are temperature, humidity, wind and water surface area. It is of course to be preferred that the pan be exposed to the same environmental conditions as the plants. However, even when the above condition is met, the evaporation rate from the pan is usually significantly less than the combined evaporation and transpiration rates of the plants. This usually will necessitate correspondingly increasing the surface area of the pan 2–3 times the average planter top soil area.

It is important to emphasize that a definite numerical relationship exists between the evaporation rate of the fluid in the pan and the combined evaporation and transpiration rates of the plants. As a result, the flow rate to each of the plants must be proportional to the flow rate to the pan.

When sufficient water has evaporated from the pan to leave less than a predetermined amount in it, the valve means open once again and the cycle repeats itself.

By using the device of the invention, all of the disadvantages of previous methods are overcome. The device of the invention can be simply and inexpensively manufactured and operated. It automatically irrigates the plants based on their current evapotranspiration needs. The determination of the evapotranspiration needs of the plants is not dependent on one plant alone nor on the condition of a small soil sample. Rather, the factors which affect the evaporation of water from the plants and their surrounding soil determine their watering rate. Most importantly, a large number of individual plants can now be automatically irrigated using only one device.

The device of the invention is especially suited for drip-feed type irrigation, in which the water is delivered to the plant drop-wise rather than in large amounts. This is effected by using narrow "spaghetti" drip irrigation dispensing means such as drip tubes or drip nozzles assembled with tubes as laterals. Each plant can be 'hooked-up' to the device through such a tube. By adjusting the length or diameter of the individual tube or nozzle reaching the plant, each plant receives its required amount of water during the irrigation stage. Of course, it is to be understood that the pan and plants can be supplied with fluids using other types of tubes or valves such as adjustable flow needle valves.

This invention can be used, for example, by individuals wishing to water their household plants while they are away, as well as by commercial plant nurseries which need a simple, reliable and efficient means to water hundreds or even thousands of plants. In addition to water, the device can also dispense other fluid-based substances needed by plants such as liquid chemical fertilizers.

Further features and advantages of the invention will be apparent from the description below.

BRIEF DESCRIPTION OF THE DRAWINGS

The invention is herein described, by way of example only, with reference to the accompanying drawings, wherein:

FIG. 3 is a top view of FIG. 1 along lines III—III;

FIG. 4 is a front sectional view of another embodiment of the device of the invention with the valve in the open position.

DESCRIPTION OF PREFERRED EMBODIMENTS

Figure 1:
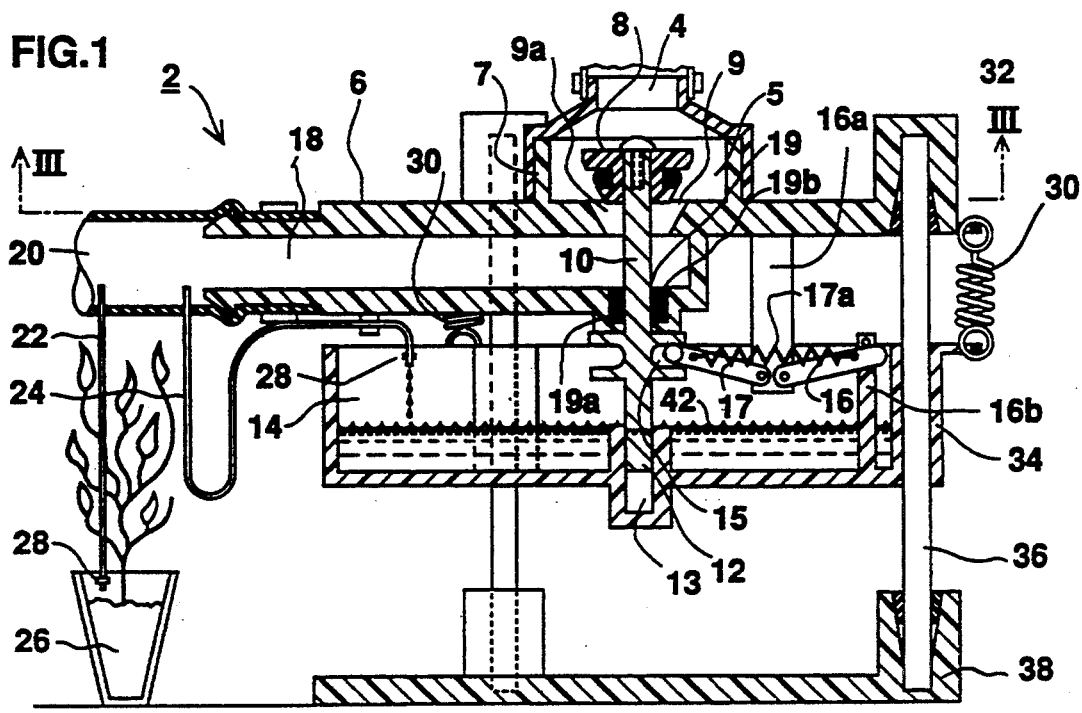
FIG. 1 is a front sectional view of one embodiment of the device of the invention with the valve in the open position.
Figure 2:
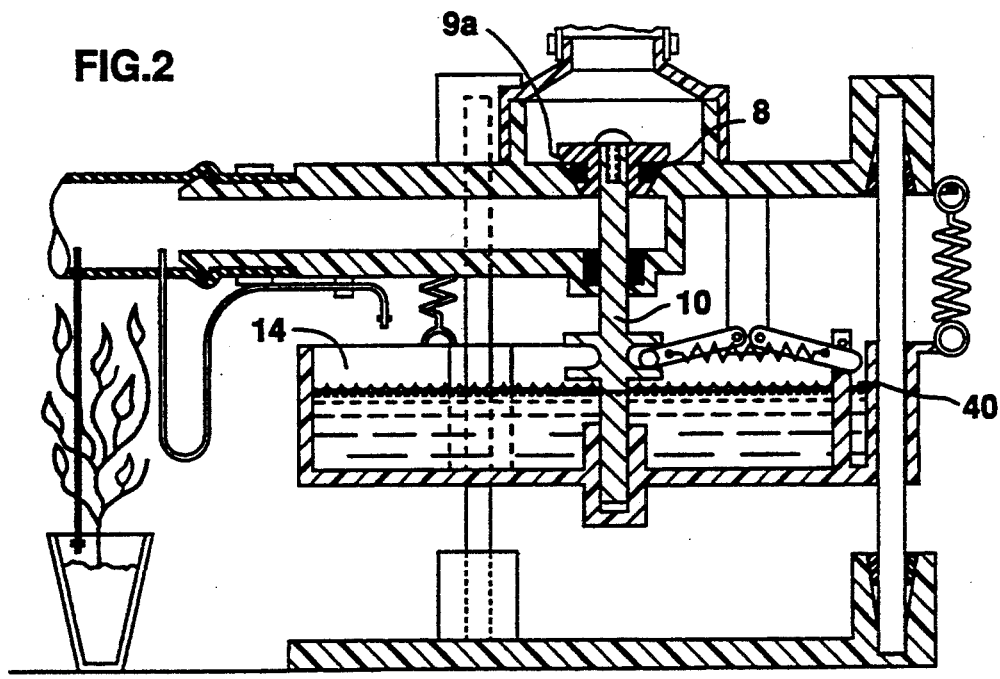
FIG. 2 is a front sectional view of the embodiment of FIG. 1 with the valve in the closed position.

Referring now to FIGS. 1-3, there is illustrated one embodiment of the device of the invention. The device 2 comprises a fluid inlet port 4 mounted on valve means 5. The port 4 can be connected directly to a water line through a water level sensor that actuates a valve, or it can lead from a manually filled water tank.

The valve means 5 is mounted on the upper side 6 of the device and comprises a housing 7 loosely enclosing a valve head 8 in the shape of an inverted truncated right circular cone. The bottom side of the housing contains a centrally located opening 9 in the upper side 6 leading into a valve seat 9a. The head 8 is mounted on one end of a connecting valve rod 10 whose opposite end 12 slidably moves in an up-and-down direction in rod seat 13 which is set in the center of the floor of an open-top fluid evaporation pan 14. A coupling means 15 in the form of a circular groove projects from either side of the valve rod 10. Two levers 16 & 17 are pivotably attached to a post 16a extending vertically from the lower surface of side 6 downwards towards the pan. The other end of lever 17 is freely inserted in the coupling means 15 while the other end of lever 16 is coupled to the pan through a column 16b which extends vertically upwards from the floor of the pan. An extension spring 17a is stretched between the two levers to form a double toggle mechanism. Although only one of these mechanisms is illustrated, it is preferrable to have a number of them in the device.

The rod can move in an up-and-down vertical direction as a result of the toggling action of the levers 16 & 17 which in turn are actuated by the amount of water in the pan as will be described below. Movement of the rod in a down direction causes the lower side of the valve head to press tightly against the complementary-shaped valve seat 9a thereby firmly sealing the opening 9 at the bottom of the housing. The levers and extension spring act as a reversible bi-stable actuating means which closes and opens the valve head by snap-action, as will also be described below.

The opening 9 leads through the seat 9a to one end of a horizontal fluid conduit 18 which rod 10 perpendicularly traverses. The rod extends through an opening 19 in the bottom side of the conduit 18 oppositely aligned with the opening 9 of the valve seat, and sealed by a sealing ring 19a and a retaining bushing 19b. A plurality of drip-irrigation tubes, two, 22 and 24, of which are shown in the figures, extend from the opposite end 20 of the conduit. One tube 22 leads to a potted plant 26 while the other tube 24 leads to the pan 14. The ends of the tubes can be fitted with a flow restrictor device 28 such as is described in Applicant's U.S. Pat. No. 4,715,543.

The pan is hung from the ends of extension springs 30 which are connected at their opposite ends to steps 32 outwardly extending from the upper side 6 of the device. A number of cylindrical axially-extending bores 34 spaced around the periphery of the pan are slidably engaged with a like number of vertical guide bars 36 fixed around the periphery of the base 38 of the device.

FIG. 1 illustrates the device 2 in the irrigation stage of operation. The extension springs 30 are in a contracted state so that the pan 14, rod 10 and valve head 8 are in a raised position. Water enters the device through the port 4, opening 9 and pipe 18 and waters the plant 26 while simultaneously filling the pan.

When the water reaches a first predetermined level 40 in the pan (FIG. 2), the weight of the water together with the weight of the pan and its attached elements and together with the back pressure of the water supply overcome the resisting force of the springs 30 and spring 17a and the frictional force of the rod and bar movements. The pan descends to a lowered position causing the column 16b to pull down the lever 16. As a result, extension spring 17a causes lever 17 to lower the rod 10 through the coupling means 15. As a result, the valve head seals the opening 9, therby cutting off the inflow of water into the device and initiating the evaporation stage. The levers 16 & 17 and spring 17a ensure that the valve abruptly closes by snap-action when the water reaches the level 40. Other types of reversible bi-stable actuating means which close and open the valve by snap-action in response to the movement of the pan are of course possible.

As the water evaporates from the pan, it becomes progressively lighter. When the water reaches a second predetermined level 42 in the pan (FIG. 1), the pan and column 16b rise lifting the lever 16. The spring 17a causes the lever 17 to abruptly lift the rod, thereby opening the valve means. Due to the action of the double toggle, the second water level 42 is significantly lower than the first water level 40, thereby allowing sufficient time for evaporation of the water. Thus the device abruptly alternates between two stable states.

FIG. 4 illustrates another embodiment of the invention in which the extension springs are replaced by compression springs 44 located between the lower surface of the pan and the base 38 of the device. A water reservoir 46 having a float-lever valve 48 to protect from overfilling is mounted on the inlet port 4. Another difference between this embodiment and the previous one is in the valve rod 49 which is directly connected to the evaporating pan 14. The opening and closing of the valve head 8 is thus directly controlled by the height of the pan.

One feature of the invention illustrated in FIG. 4 is a sponge-like mat 50 for accelerating the evaporation of the water from the pan, thus conforming the evaporation conditions of the pan more closely to those of the plants.

A further feature of the invention illustrated in the figure is an adjustable flow needle valve 51. The valve can be used to adjust the flow rate into the pan and therefore the duration of the irrigation stage, as was explained above.

Figure 5:
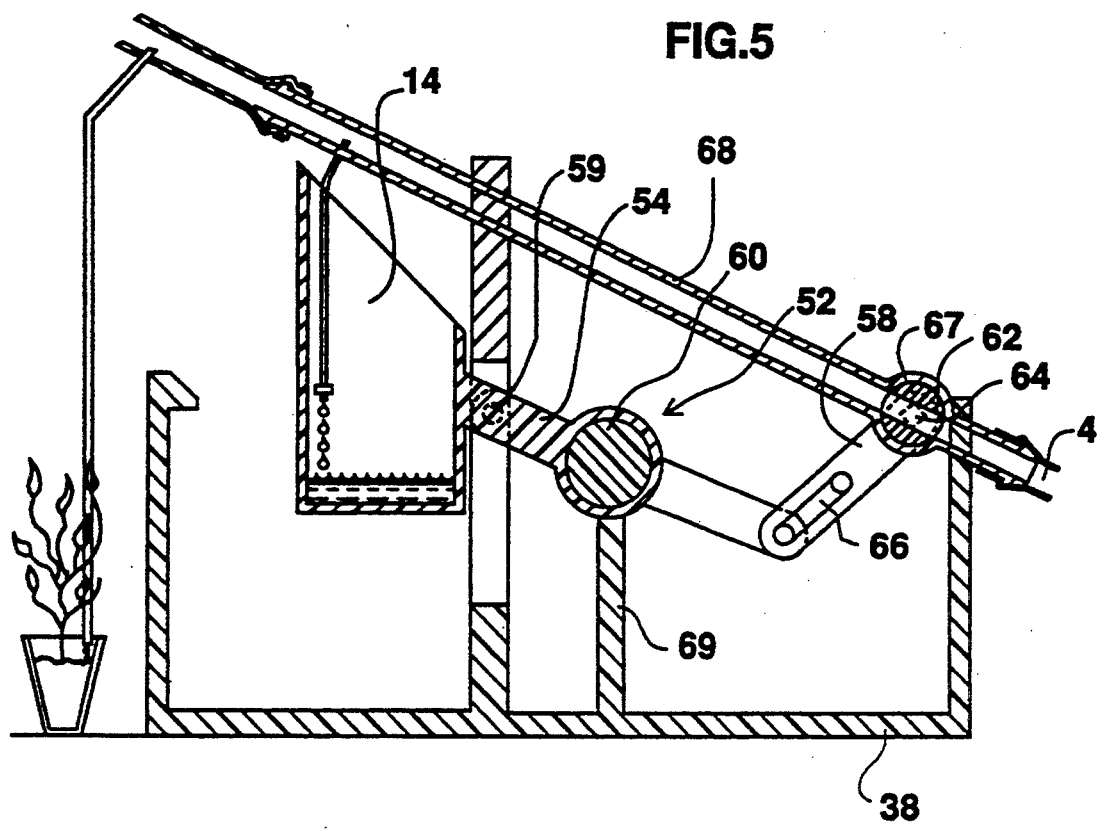
FIGS. 5 & 6 are front sectional views of a third embodiment of the invention with the valve in the open and closed position, respectively.
Figure 6:
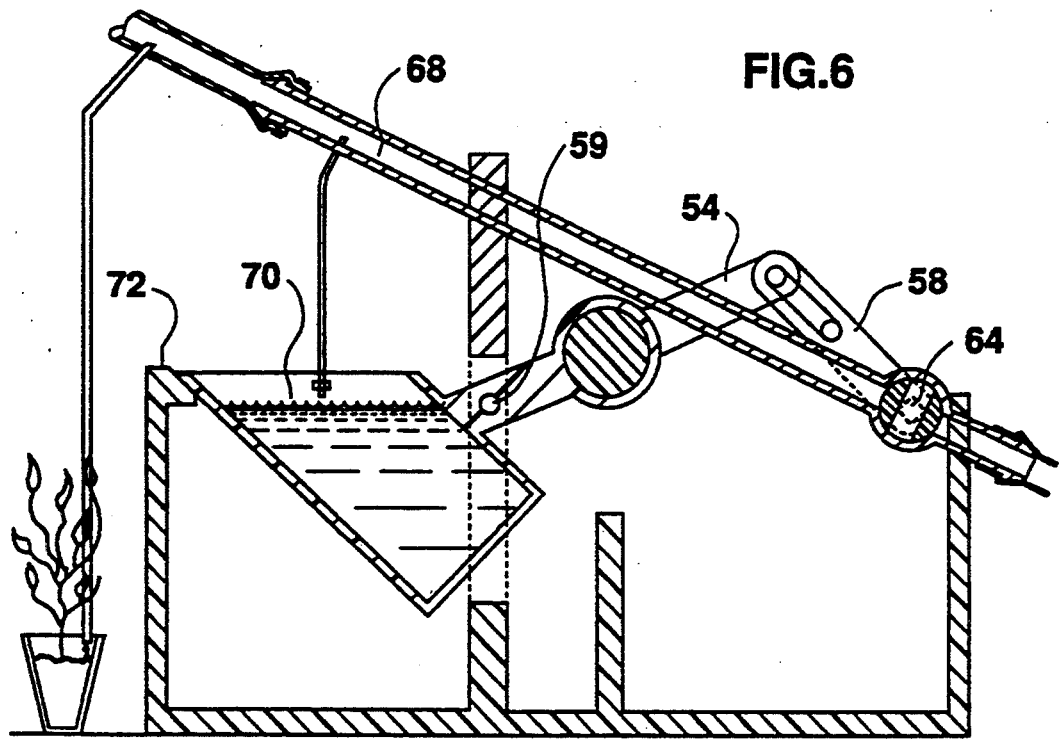

A third embodiment of the invention is illustrated in FIGS. 5 & 6 in which the spring mechanism has been replaced by a weighted mechanism 52. A pivotably mounted lever 54 is attached at one end to the pan 14 and at its other end to a valve arm 58, pivoting around pivot axis 59. A counter-balance weight 60 is fixed to the lever 54 mid-way between its two ends. The valve arm 58 is attached at one end to a ball valve 62 having an internal linear passageway 64, and has an elongated slot 66 at its opposite end to facilitate free arc movement of the valve arm around the lever. The ball valve is inserted in a housing 67 near one end of a fluid transport pipe 68 on which end is mounted the inlet port 4.

During the irrigation stage, the counter weight 60 rests on a vertical column 69 which stands on the base 38 of the device. The ball valve 62 is situated so that its internal passageway 64 is alligned with the internal bore of pipe 68 allowing the flow of water from the port to the plants 26 and pan 14.

When the water reaches a first predetermined level 70 in the pan (FIG. 6), the weight of the water and pan overcome the counter-balance weight and all linkage and ball valve frictional forces, and the pan pivotably descends until it rests on a shoulder 72. At the same time, lever 54 pivots around pivot axis 59 raising valve arm 58 and turning the ball valve so that its passageway is now perpendicular to the pipe 68. This closes off the water flow and the device enters the evaporation stage. The pan will return to its raised position only after a substantial amount of water has evaporated from it.

While the present invention has been described in terms of several preferred embodiments, it is expected that various modifications and improvements will occur to those skilled in the art upon consideration of this disclosure.

What is claimed is:

1. An irrigation device for supplying irrigating water to plants, comprising:
   a base;
   an open evaporation pan for receiving water to be evaporated;
   a displaceable mounting for said evaporation pan permitting the evaporation pan to descend or rise with respect to said base according to the weight of the evaporation pan and the water therein;
   a conduit for conducting water from a water source to a plant to be irrigated, and to the evaporation pan;
   a valve including a valve member and a valve actuator for opening or closing water flow to the conduit;
   and a toggle mechanism coupled to said evaporation pan and said valve actuator, and including an over-center spring to actuate the toggle mechanism with a snap-action to a first stable state closing said valve when the evaporation pan has received sufficient water to cause it to descend to a first position with respect to said base, or to a second stable state opening said valve when sufficient water has been evaporated from the evaporation pan to cause it to rise to a second position with respect to said base.

2. The irrigation device according to claim 1, wherein said toggle mechanism comprises:
   first and second levers each being pivotally mounted at one of their ends to a member fixed with respect to said base;
   the end opposite said one end of said first lever being coupled to a member carried by said evaporation pan;
   the end opposite said one end of said second lever being coupled to said valve actuator;
   said over-center spring being connected at a point intermediate said one and opposite ends of each of said first and second levers.

3. The irrigation device according to claim 2, wherein said opposite end of said first lever is coupled to a column which extends vertically upwards of the evaporation pan.

4. The irrigation device according to claim 2, wherein said opposite end of said second lever is coupled to said valve actuator by being received within a recess formed in said valve actuator.

5. The irrigation device according to claim 2, wherein said member fixed with respect to said base is a post overlying said evaporation pan.

6. The irrigation device according to claim 1, wherein said valve actuator includes a rod carrying said valve member at one end, the opposite end of the rod being received in a rod seat carried by said evaporation pan.

7. The irrigation device according to claim 1, wherein said displaceable mounting for said evaporation pan comprises a plurality of springs supporting said evaporation pan over said base.

* * * * *